United States Patent [19]

Krauss

[11] Patent Number: 5,383,426
[45] Date of Patent: * Jan. 24, 1995

[54] NON-CHOKING STRAIN-REDUCING DOG HARNESS

[75] Inventor: Mark J. Krauss, East Greenwich, R.I.

[73] Assignee: American Cord & Webbing Co., Inc., Woonsocket, R.I.

[*] Notice: The portion of the term of this patent subsequent to Jul. 5, 2011 has been disclaimed.

[21] Appl. No.: 183,171

[22] Filed: Jan. 18, 1994

Related U.S. Application Data

[63] Continuation-in-part of Ser. No. 141,115, Oct. 21, 1993, Pat. No. 5,325,819.

[51] Int. Cl.6 ............................................. A01K 27/00
[52] U.S. Cl. .................................... 119/793; 119/864; 119/905
[58] Field of Search .............. 119/792, 793, 856, 905, 119/907, 864, 795, 797

[56] References Cited

U.S. PATENT DOCUMENTS

| | | | |
|---|---|---|---|
| 1,685,435 | 9/1928 | Philbrick | 119/907 |
| 2,458,489 | 1/1949 | Hallander | 119/793 |
| 2,670,712 | 3/1954 | Patience et al. | 119/907 |
| 3,311,088 | 3/1967 | Peterlin | 119/793 |
| 3,769,939 | 11/1973 | Wais et al. | 119/856 |
| 4,676,198 | 6/1987 | Murray | 119/856 |
| 4,964,369 | 10/1990 | Sporn | 119/864 |

FOREIGN PATENT DOCUMENTS

| | | | |
|---|---|---|---|
| 2142206 | 1/1973 | France | 119/907 |
| 2304284 | 10/1978 | France | |
| 2109215 | 6/1983 | United Kingdom | 119/793 |
| 2201874 | 9/1988 | United Kingdom | |

Primary Examiner—Todd E. Manahah
Attorney, Agent, or Firm—Kane, Dalsimer, Sullivan, Kurucz, Levy, Eisele & Richard

[57] ABSTRACT

A dog harness has a collar having a front ring and at least one ring located at its free ends. A releasable buckle functions to releasably couple the collar free ends. A cord passes through the front ring and forms a pair of loops for disposition in the foreleg pits of a dog. A fastener at a cord free end releasably secures this end which cord is also adapted to be coupled permanently with a leash. A strain on the leash and harness caused by the dog will exert pressure to the foreleg pits which will result in the dog reacting to decrease this pressure.

10 Claims, 5 Drawing Sheets

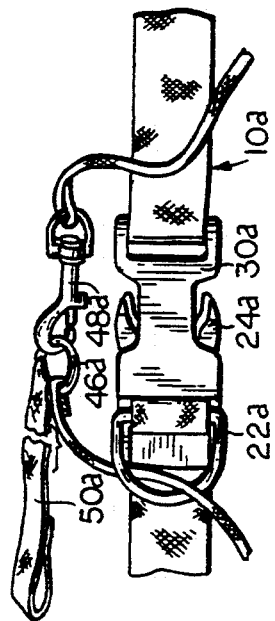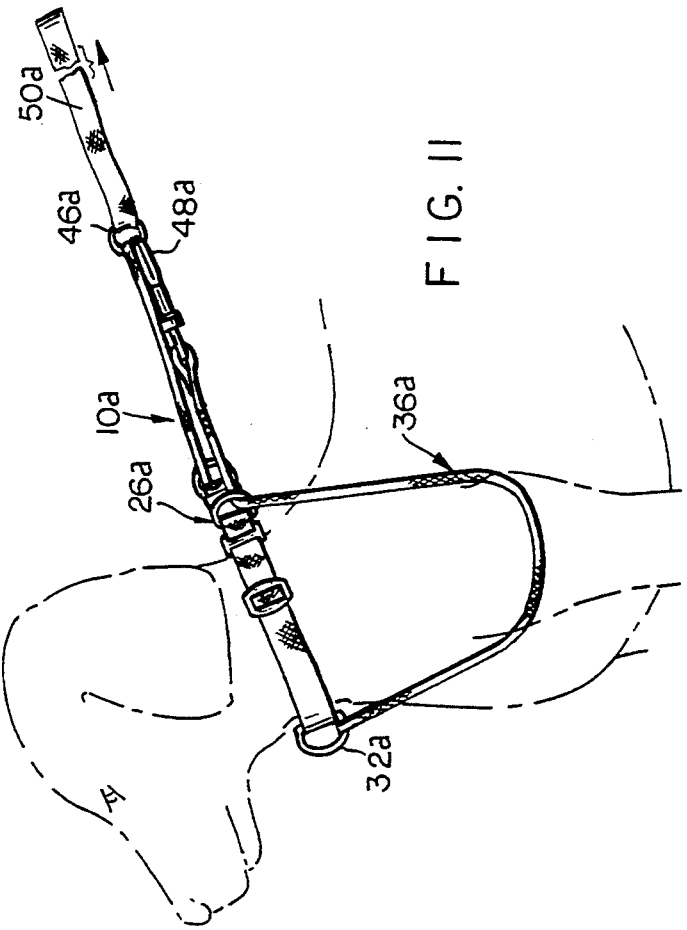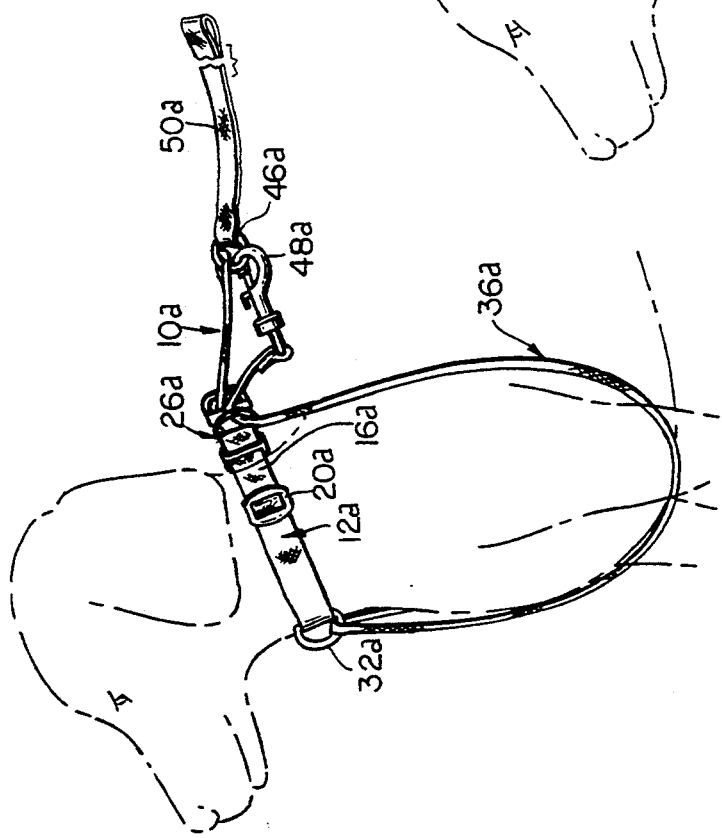

5,383,426

NON-CHOKING STRAIN-REDUCING DOG HARNESS

REFERENCE TO RELATED APPLICATION

This application is a continuation-in-part of application Ser. No. 08/141,115 filed Oct. 21, 1993.

BACKGROUND OF THE INVENTION

As explained in the above referenced application, the typical harness and collar for dogs when attached to a leash will cause the dog to choke when it strains against the leash. This adverse reaction on the part of the dog is undesirable and should be avoided. Attempts have been made to provide a non-choking type of harness, as for example, the harness disclosed in U.S. Pat. No. 4,964,369. While these prior art harnesses have proved effective, they did possess several shortcomings with respect to ease of attachment and manufacturing assembly.

OBJECTIVES AND SUMMARY OF THE INVENTION

A principal object of this invention is to improve upon the prior art non-choking and strain-reducing dog harness by providing a harness of the type disclosed in the above referenced patent application that is relatively easily manufactured and assembled at low cost and with fewer parts.

The harness of this invention is advantageously attached to a leash and inhibits the dog from straining against the leash and, at the same time, avoids any choking action. The harness includes a collar releasably attached to the neck of the dog by a releasable buckle. A single cord passes through at least one D-ring at either or both of the male and female members of the buckle and through another D-ring located about midway between these buckle members; and either attached to or slidable on the collar to form a pair of loops. Each loop extends under the foreleg pits of the dog. The free ends of the cord have secured thereto an O-ring at one end and a latch at the other end. These ends are latched together after the buckle is latched and the leash is then attached to the O-ring. In this fashion, when the dog strains on the leash, the cord is tightened around the foreleg pits exerting a pressure thereon without choking the dog. This applied pressure will cause the dog to reduce the strain on the leash, and, consequently, the cord. The present invention contemplates forming the leash and cord as a single unit for ease of manufacture and assembly with fewer parts thereby reducing costs.

BRIEF DESCRIPTION OF THE DRAWINGS

The objects and advantages of the present invention will become apparent from the following detailed description of a preferred embodiments which is to be taken in conjunction with the accompanying drawings in which:

FIG. 9 is an enlarged fragmentary plan view showing the collar and cord of the embodiment of FIGS. 7-8 buckled and fastened, respectfully;

FIG. 10 is a side view of the harness of FIGS. 7-9;

FIG. 11 is another side view of the harness of FIGS. 7-10 with a strain applied to the leash showing the tightening of the cord around the foreleg pits of the dog.

DETAILED DESCRIPTION OF PREFERRED EMBODIMENTS

Figure 2:
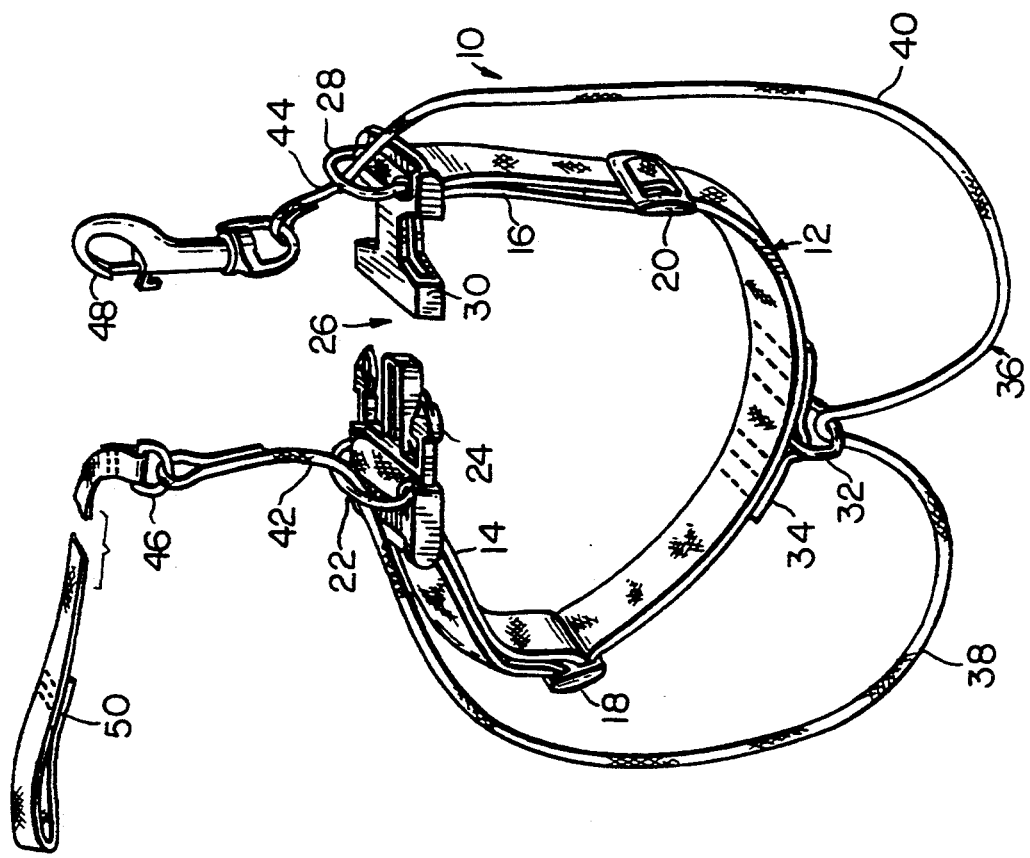
FIG. 2 is an enlarged perspective view of the harness having both the collar and cord unbuckled and unfastened, respectfully, showing the permanent attachment of the cord to the leash.

In the drawings, a dog harness 10 includes a collar 12 adapted to be releasably applied to the neck of a dog. The free ends of the collar are formed with loops 14 and 16 and in a known manner pass through rings 18 and 20, respectively, and are reverse folded and attached by sewing to permit adjustment of the length of the collar to accommodate the size neck of the dog. Loop 14 passes through D-ring 22 and about the post of the male member 24 of releasable buckle 26. Loop 16 passes through D-ring 28 and about the post of female member 30 of buckle 26. At the midpoint of the exterior of the collar 12 is a D-ring 32 secured by a strip 34 sewn to the collar.

A cord 36 forms two loops 38 and 40 designed to fit under the foreleg pits of the dog. In this regard the cord passes through D-ring 32 and one free end 42 passes through D-ring 22 and the other free end 44 passes through D-ring 28. Free end 42 is looped around and secured to D-ring 46 while free end 44 is looped around and secured to fastener 48 which releasably fastens to the D-ring 46 According to the present invention, D-ring 46 is advantageously permanently attached to the leash 50 so that leash 50 and cord 36 are a single unit in order to reduce manufacturing and assembly costs.

Figure 1:
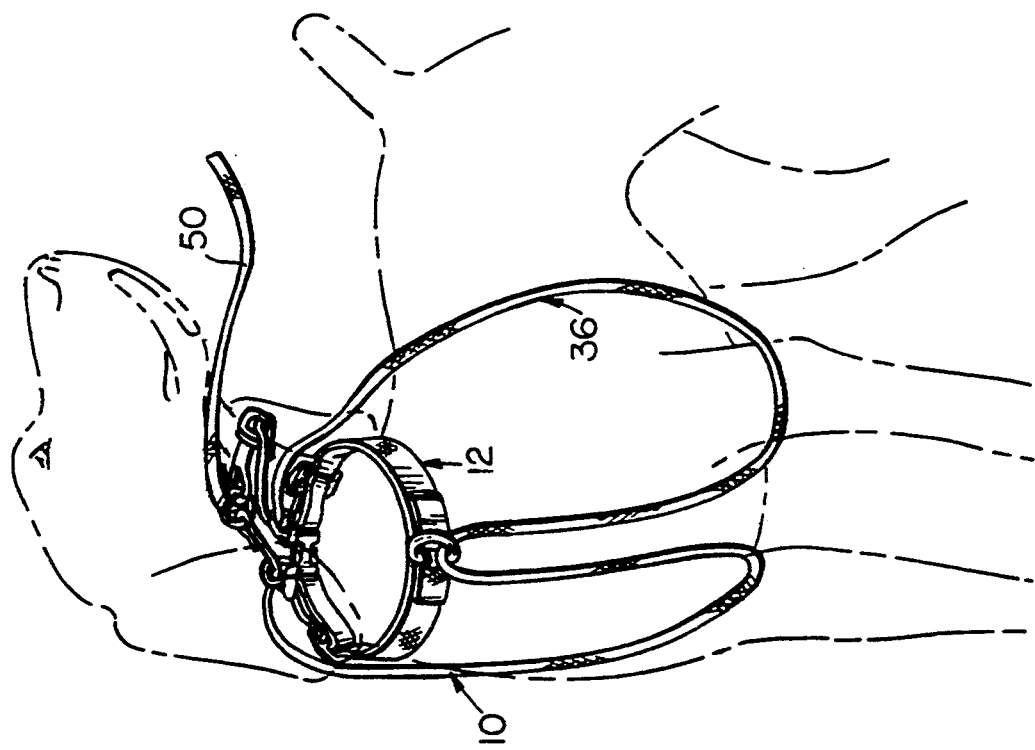
FIG. 1 is a perspective view of the harness of this invention applied to a dog and with the cord permanently attached to a leash.
Figure 3:
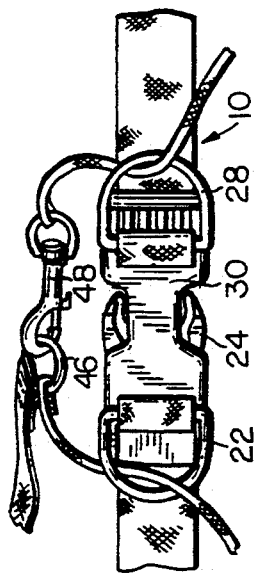
FIG. 3 is an enlarged fragmentary plan view showing the collar and cord buckled and fastened, respectively.
Figure 5:
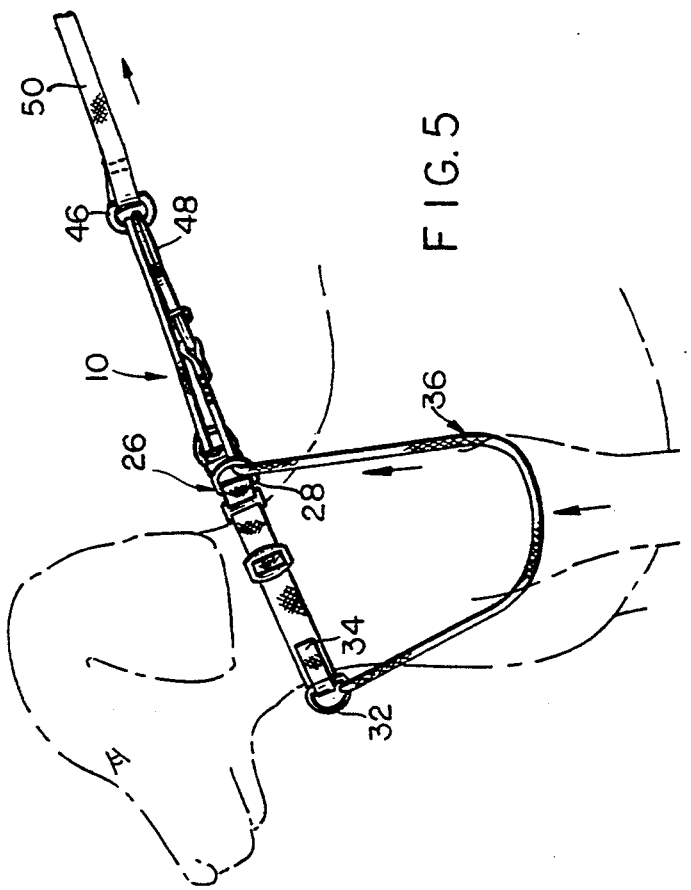
FIG. 5 is another side view of the harness with a strain applied to the leash showing the tightening of the cord around the foreleg pits of the dog.
Figure 4:
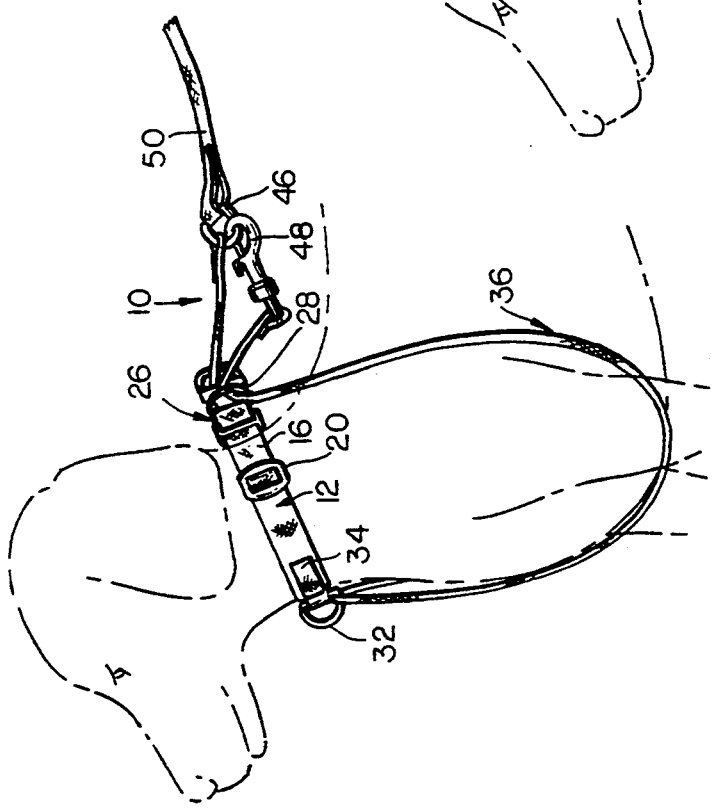
FIG. 4 is a side view of the harness and leash of FIG. 1.

The harness 10 prior to attaching to a dog is shown in FIG. 2 with buckle 26 released and fastener 48 removed from D-ring 46. The forelegs of the dog are passed through loops 38 and 40 of cord 36 and these loops are disposed in the pits of the forelegs. The male member 24 of buckle 26 is inserted into the female member 30 to secure the collar about the neck of the dog. Where necessary the loops 14 and 16 may be adjusted to increase or decrease the length of the collar by manipulating and sliding the rings 18 and 20. The fastener 48 is latched to the D-ring 46 and the D-ring 46, as stated, is permanently connected to the leash 50. FIGS. 1, 4 and 5 illustrate the manner by which the harness is mounted on the dog with FIG. 3 showing the securement of the buckle 26 and the fastener 48 to D-ring 46. Obviously, where more convenient or desirable, the order of applying and securing the cord loops 38 and 40 and collar 12 as well as buckle 26 and fastener 48 to D-ring 46 may be changed. FIGS. 1 and 4 show the harness on the dog in a relatively unstrained state. However, when the harness is strained, as shown in FIG. 5, the cord loops 38 and 40 tighten about the foreleg pits of the dog. Experience has found that a dog does not tolerate this pressure too well and normally will react to release this pressure.

Figure 6:
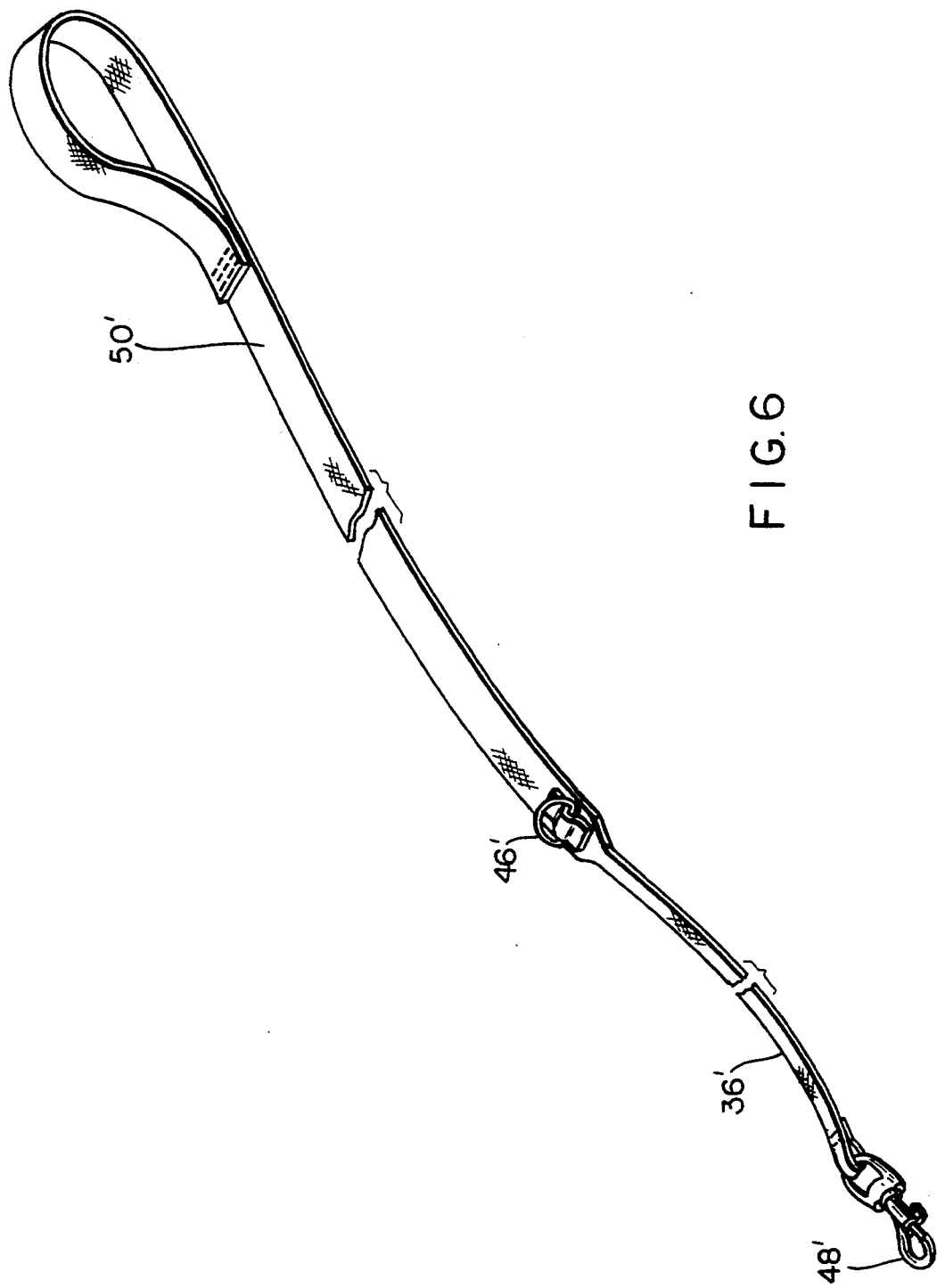
FIG. 6 is an enlarged perspective view of another embodiment of the single unit of cord and leash usable in the embodiment of FIGS. 1-5 and in which the cord and leash are integral as distinct from permanently attached separate members.
Figure 8:
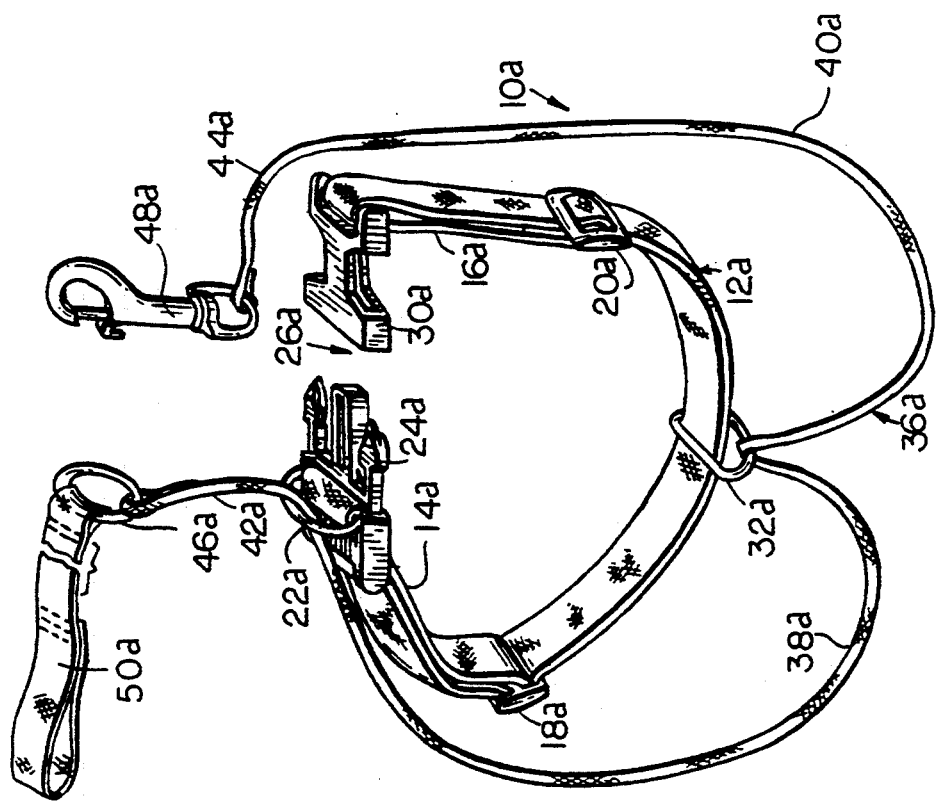
FIG. 8 is an enlarged perspective view of the harness of FIG. 7 having both the collar and cord unbuckled and unfastened, respectfully, showing the permanent attachment of the cord and the leash.
Figure 7:
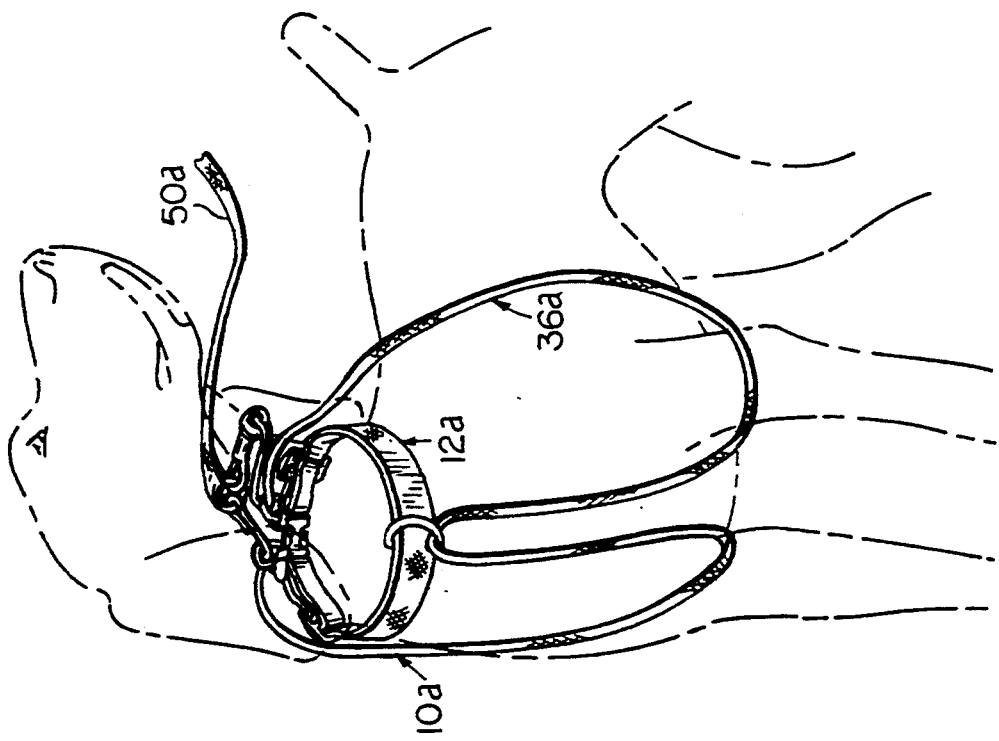
FIG. 7 is a perspective view similar to FIG. 1 showing another embodiment of harness that embodies fewer parts.

The present invention contemplates providing the leash and cord as an integral unit. In this regard, reference is made to FIG. 6 in which leash 50' and cord 36' are integrally formed. Fastener 48' is at the free end of the cord 36' and is adapted to engage with the D-ring 46'. In all other respects, the embodiment of FIG. 6 is functionally and structurally usable with the embodiment of FIGS. 1-5.

Reference is now made to the embodiment of dog harness 10a shown in FIGS. 7-11 which may include a leash 50a permanently attached to cord 36a as disclosed in the embodiment of FIGS. 1-5 and 6 or one that is separate as in the above-referenced application. This embodiment contemplates a D-ring 32a which is slidable on the collar 12a to freely accommodate the legs of the animal to be leashed and restrained.

The embodiment of FIGS. 7-11 contemplate utilizing a single D-ring 22a to receive the free end 42a and 44a of the cord 36a. In all other respects this embodiment is similar to the embodiment of FIGS. 1-5 and will be similarly numbered with a subscript a.

Thus, the several aforementioned objects and advantages are most effectively attained. Although a several somewhat preferred embodiment of the invention has been disclosed and described in detail herein, it should be understood that this invention is in no sense limited thereby and its scope is to be determined by that of the appended claims.

I claim:

1. A dog harness adapted to be attached to a dog and coupled with a leash comprising:
    a split collar having two ends for placing around the neck of a dog and having a front and a rear, a front ring on the front of the collar and a releasable buckle attached to the ends of the collar with a buckle male member attached to one end and a buckle female member attached to the other end, at least one rear ring attached to the rear of the collar;
    a cord passing through the front ring to form a pair of loops to be disposed within the foreleg pits of the dog, the cord having a pair of ends, the cord ends passing through the at least one rear ring, the cord being permanently attached to the leash, a fastener attached to an end of the cord for releasably attaching to a further ring attached to the other cord end, the further ring coupled with the leash;
    whereby when the leash and harness are unstrained the cord loops are loose and do not apply pressure to the foreleg pits of the dog, and when the leash and harness are strained, the cord loops apply pressure to the foreleg pits of the dog causing the dog to react to decrease the pressure.

2. The invention in accordance with claim 1 wherein the collar has means for adjusting the length thereof.

3. The invention in accordance with claim 2 wherein each end of the collar is looped and includes a slip ring for cooperating in adjusting the length of the collar.

4. The invention in accordance with claim 3 wherein the male member and female member of the buckle include posts and the loop at one end of the collar passes about the post of the male member and the loop at the other end of the collar passes about the post of the female member.

5. The invention in accordance with claim 4 wherein the at least one rear ring is at one collar end and another rear ring is at the other collar end, the loop at one end of the collar also passes through the at least one rear ring and the loop at the other end of the collar also passes through the another rear ring.

6. The invention in accordance with claim 1 wherein the front and rear rings are D-rings.

7. The invention in accordance with claim 1 wherein a strip is sewn to the collar to attach the front ring thereto.

8. A dog harness adapted to be attached to a dog and coupled with a leash comprising:
    a split collar having two ends for placing around the neck of a dog and having a front and a rear, a front ring on the front of the collar and a releasable buckle attached to the ends of the collar with a buckle male member attached to one end and a buckle female member attached to the other end, a rear ring means attached to the collar at an end thereof;
    a cord passing through the front ring to form a pair of loops to be disposed within the foreleg pits of the dog, the cord having a free end passing through the rear ring means, and a fastener attached to a free end of the cord for releasably attaching to the rear ring means;
    whereby when the leash and harness are unstrained the cord loops are loose and do not apply pressure to the foreleg pits of the dog, and when the leash and harness are strained, the cord loops apply pressure to the foreleg pits of the dog causing the dog to react to decrease the pressure.

9. The invention in accordance with claim 8 wherein the cord is permanently attached to the leash.

10. The invention in accordance with claim 9 wherein the cord is integral with the leash.

* * * * *